(12) United States Patent
Weber et al.

(10) Patent No.: US 6,482,758 B1
(45) Date of Patent: Nov. 19, 2002

(54) SINGLE PHASE RARE EARTH OXIDE-ALUMINUM OXIDE GLASSES

(75) Inventors: J. K. Richard Weber, Arlington Heights, IL (US); Johan G. Abadie, Chicago, IL (US); April D. Hixson, Cedar Rapids, IA (US); Paul C. Nordine, Deerfield, IL (US)

(73) Assignee: Containerless Research, Inc., Evanston, IL (US)

( * ) Notice: Subject to any disclaimer, the term of this patent is extended or adjusted under 35 U.S.C. 154(b) by 50 days.

(21) Appl. No.: 09/679,731

(22) Filed: Oct. 4, 2000

Related U.S. Application Data

(60) Provisional application No. 60/159,380, filed on Oct. 14, 1999.

(51) Int. Cl.[7] ............................. C03C 3/12; C03C 3/062
(52) U.S. Cl. ........................... 501/41; 501/50; 501/52; 501/73; 501/78
(58) Field of Search ............................. 501/41, 50, 52, 501/73, 78

(56) References Cited

U.S. PATENT DOCUMENTS

| | | | |
|---|---|---|---|
| 2,206,081 A | | 7/1940 | Eberlin |
| 2,805,166 A | * | 9/1957 | Loffler ........................ 501/73 |
| 4,088,023 A | * | 5/1978 | Berleue et al. ............... 501/73 |
| 4,530,909 A | * | 7/1985 | Makishima et al. |
| 4,608,352 A | * | 8/1986 | Laurent et al. |
| 4,789,501 A | | 12/1988 | Day et al. |
| 4,940,678 A | * | 7/1990 | Aitken |
| 5,175,787 A | | 12/1992 | Gualtieri et al. |
| 5,288,344 A | | 2/1994 | Peker et al. |
| 5,378,662 A | * | 1/1995 | Tsuyuki |
| 5,413,971 A | | 5/1995 | McPherson |
| 5,491,767 A | | 2/1996 | McPherson et al. |
| 5,747,397 A | | 5/1998 | McPherson et al. |

FOREIGN PATENT DOCUMENTS

WO    WO97/25284    7/1997

OTHER PUBLICATIONS

W. Vogel, *Chemistry of Glass*, translated by N. Kreidl, American Ceramic Society, Columbus, OH 1985 pp. 1–15.
H.G. Pfaender, *Schott Guide to Glass*, 2nd Edition, Chapman and Hall, London, 1996 pp. 48–50.
W.D. Kingery, H.K. Bowen, D.R. Uhlmann, *Introduction to Ceramics*, 2nd Edition, Wiley, New York, 1976, pp. 110–125
P.C. Becker, N.A. Olsson, J.R. Simpson, *Erbium–Doped Fiber Amplifiers*, Academic Press, 1999. pp. 108–110.
*Handbook of Optics*, M. Bass, Ed., 2nd edition, Sponsored by the Optical Society of America, 1995 p. 123.
Cornish, *Materials and the Designer*, Cambride University Press, Cambridge, 1987, pp. 87–89.
Y. Zhou, "Growth of High Quality Large Nd:YAG Crystals by Temperature Gradient Technique (TGT)," J. Cryst. Growth, 78, 31–5 (1986).
Y. Sun, J. W. Sulhoff, A. K. Srivastava, J. L. Zyskind, T. A. Strasser, J. R. Pedrazzani, C. Wolf, J. Zhou, J. B. Judkins, R. P. Espindola, and A. M. Vengsarkar, "80 nm Ultra–wideband Erbium–doped Silica Fibre Amplifier," Electron. Lett., 33, 1965–1967, (1997).

(List continued on next page.)

*Primary Examiner*—David Sample
(74) *Attorney, Agent, or Firm*—Bullwinkel Partners, Ltd.

(57) ABSTRACT

A bulk single phase glass comprising 23 molar % to 50 molar % rare earth oxides, $RE_2O_3$, and 50 molar % to 77 molar % aluminum oxide, $Al_2O_3$ is provided. The glass contains at least 50 molar % of $Al_2O_3+RE_2O_3$ and smaller amounts of oxide glass forming agents and other oxides than are found in prior art glasses. The addition of small amounts of lanthanum oxide, $La_2O_3$, prevents phase separation. The single phase glass is useful for optical applications such as lasers and optical amplifiers.

13 Claims, 3 Drawing Sheets

OTHER PUBLICATIONS

Y. Ohishi, A. Mori, M. Yamada, H. Ono, Y. Nishida and K. Oikawa, "Gain characteristics of Tellurite–based Erbium–doped Fiber Amplifiers for 1.5–$\mu$m Broadband Amplification," Opt. Lett., 23, 274–276, (1998).

R.D. Shannon and C.T. Prewitt, "Effective Ionic Radii in Oxides and Fluorides," Acta Cryst., B25, 925 (1969).

J.B. Hendrick, "Minerals Review—Rare Earths", Am. Ceram. Soc. Bull., 78, 139–41 (1999).

S. Aasland and P.F. McMillan, "Density–driven Liquid–liquid Phase Separation in the System $Al_2O_3$–$Y_2O_3$," Nature, 369, 633–36 (1994).

J.P. Coutures, J.C. Rifflet, D. Billard and P. Coutures, "Contactless Treatments of Liquids in a Large Temperature Range by an Aerodynamic Levitation Device and Laser Heating," Proc. 6th European Symposium on Materials Sciences under Microgravity Conditions, Bordeaux, France 2–5 Dec., 1986, ESA SP–256, 1987, pp. 427–30.

M.C. Badets, C. Bessada, P. Simon, D. Billard, A. Douy, D. Massiot, J.C. Rifflet and J.P. Coutures, "Material Processing and Characterization of $Y_3Al_5O_{12}$ and $CaAl_2O_4$ Glasses Under Contactless Conditions," Proc. VIIth European Symposium on Materials and Fluid Sciences in Microgravity, Oxford, UK, Sep. 10–15, 1989, ESA SP–295 (1990) pp. 511–517.

M. Gervais, S. Lefloch, N. Gautier, D. Massiot and J.P. Coutures, "Crystallization of $Y_3Al_5O_{12}$ Garnet from Deep Undercooled Melt, Effect of the Al–Ga Substitution," Mat. Sci. and Eng., B45, 108–13 (1997).

C.G. Levi, V. Jayaram, J.J. Valencia and R. Mehrabian, "Phase Selection in Electrohydrodynamic Atomzation of Alumina," J. Mater. Res., 3, 969–83 (1988).

J.K.R. Weber, J.J. Felten, B. Cho and P.C. Nordine, "Glass Fibers of Pure and Erbium or Neodymium–doped Yttria–alumina Compositions," Nature, 393, 769–71 (1998).

P.D. Jero, F. Rebillat, D.J. Kent, J.G. Jones, "Crystallization of Lanthanum Hexaluminate from MOCVD Precursors", Ceram. Soc. Proc., 19, 359–61 (1998).

I–C. Lin, A. Navrotsky, J.K.R. Weber and P.C. Nordine, "Thermodynamics of Glass Formation and Metastable Solidification of Molten $Y_3Al_5O_{12}$," J. Non–Cryst. Solids, 243, 273–76 (1999).

J.K.R. Weber, B. Cho, A.D. Hixson, J. Ababie, P.C. Nordine, W.M. Kriven, B.R. Johnson and D. Zhu, "Growth and Crystallization of YAG–and Mullite–composition Glass Fibers," J. Eur. Ceram. Soc., 19, 2543–2550 (1999).

A. Yeganeh–Haeri, C.T. Ho, J.K.R. Weber, J. Diefenbacher and P.F. McMillan, "Elastic Properties of Aluminate Glasses via Brillouin Spectroscopy," J. Non–Cryst. Solids, 241, 200–203 (1998).

Weber, J. K. R., J.J. Felten and P. C. Nordine, "Laser hearth melt processing of ceramic materials," Rev. Sci. Instrum. 67, 522–524 (1996).

J. K. R. Weber, D. S. Hampton, D. R. Merkley, C. A. Rey, M. M. Zatarski, and P. C. Nordine, "Aero–acoustic levitation—A method for containerless liquid–phase processing at high temperatures," Rev. Sci. Instrumen. 65, 456–465 (1994).

Weber, J. K. R., C. D. Anderson, D. R. Merkley, and P. C. Nordine, "Solidification Behavior of Undercooled Liquid Aluminum Oxide," J. Am. Ceram. Soc. 78, 577–582 (1995).

Weber, J. K. R. and P. C. Nordine, "Containerless Liquid–Phase Processing of Ceramic Materials," Microgravity sci. technol. 7, 279–282 (1995).

S. Krishnan, J. J. Felten, J. E. Rix, J. K. R. Weber, P. C. Nordine, M. A. Beno, S. Ansell, and D. L. Price, "Levitation apparatus for structural studies of high temperature liquids using synchrotron radiation," Rev. Sci. Instrum. 68, 3512–3518 (1997).

J. H. Malitson, F. V. Murphy, and W. S. Rodney, "Refractive Index of Synthetic Sapphire," J. Opt. Soc. Am. 48, 72–73 (1958).

J. H. Malitson, "Refraction and Dispersion of Synthetic Sapphire," J. Opt. Soc. Am. 52, 1377–1379 (1962).

Krishnan, S., J. K. R. Weber, R. A. Schiffman, P. C. Nordine, and R. A. Reed, "Refractive Index of Liquid Aluminum Oxide at 0.6328 $\mu$m," J. Am. Ceram. Soc. 74, 881 (1991).

T.S. Sedykh, A.I. Pustil'nik, and V.I. Mikheikin, "Refractive Indices in the System $Y_2O_3$–$SiO_2$–$Al_2O_3$ in the Vitrification Region," State Scientific–Research and Design Institute of the Rare Metals Industry, Translated from Izvestiya Akademii Nauk SSSR, Neorganicheski Materialy, vol. 11, No. 6, pp. 1153–1154, Jun., 1975 (Original articles submitted Jul. 2, 1973).

* cited by examiner

SINGLE PHASE RARE EARTH OXIDE-ALUMINUM OXIDE GLASSES

This application claims the benefit of Ser. No. 60/159,380, filed Oct. 14, 1999.

STATEMENT REGARDING FEDERALLY SPONSORED RESEARCH OR DEVELOPMENT

This invention was made with government support under contract numbers NAS8-40847 and NAS8-98092 awarded by the National Aeronautics and Space Administration. The Government has certain rights in this invention.

BACKGROUND

1. Field of the Invention

The present invention relates to homogeneous glass materials formed from rare earth oxides and aluminum oxide. In particular, the present invention relates to rare earth oxide-aluminum oxide glass compositions in which the addition of lanthanum oxide eliminates the phase separation observed in prior art glasses, allowing homogeneous glasses to be prepared. The invention also relates to homogeneous glasses formed by rare earth oxides and aluminum oxide that contain smaller amounts of the glass forming agents, $SiO_2$ and/or $B_2O_3$ than are used in prior-art glasses. Such glasses comprise mixtures of rare earth element oxides ($RE_2O_3$), i.e., oxides of the elements with atomic numbers of 21, 39, 57–71: Sc, Y, La, Ce, Pr, Nd, Pm, Sm, Eu, Gd, Tb, Dy, Ho, Er, Tm, Yb, Lu, combined with aluminum oxide, $Al_2O_3$, and, optionally, additives comprising oxides of other elements.

2. Description of the Prior Art

Glasses have numerous applications in sensors, electrical insulators, instruments, optical devices, optical waveguides, and components that require uniform optical properties, uniform density, and freedom from asperities and defects that would cause light scattering. Glasses containing selected rare-earth ions or "dopants", for example, Er, Nd, Yb, Pr, Ho, Eu, are of particular value due to their applications in lasers, amplifiers, optical switches, optical filters, and optical components for light transmission at ultraviolet, visible, and infra-red wavelengths. Compared to crystals, glass "hosts" can enable much broader bandwidths and greater pulsed power output for laser transitions by providing a range of electronic environments for the laser active ions, thereby extending the range of wavelengths over which laser sources and amplifiers can be operated.

Much effort has been invested to develop glasses for commercial applications. The presence of random fluctuations (often called "striae") in composition, density, index of refraction and other properties makes a glass practically useless for optical applications, even window glass, due to light scattering and the unpredictable optical path through the material. Striae, and other inhomogeneities, also limit the utility of a glass in applications where uniform mechanical and thermal properties are required. As a result, development of homogeneous, single-phase glasses has been a priority. In addition, development of glasses with high refractive index, glass waveguides and fibers, infrared transmitting glasses, and filter glasses has been driven by continually increasing application requirements.

The prior art in oxide glass making can be described in terms of the "families" of glass based on certain glass forming agents that are currently used. The prior art "families" of glass are based on compositions which contain substantial amounts of one or more of the glass forming agents: silica, $SiO_2$; arsenic oxide, $As_2O_3$; boria, $B_2O_3$; germania, $GeO_2$; phosphorus oxide, $P2O_5$; telluria, $TeO_2$; and vanadia, $V_2O_5$. The widely used silica-based crown and flint glass families were developed in the early 1900s by Schott and others. Germanate glasses (based on germanium oxide, $GeO_2$) were developed in the 1920s, phosphate glasses (based on phosphorus oxide, $P_2O_5$) were developed in the late 1930s. Heavy metal borate glasses with high refractive index were developed by Morey in the 1940s. Tellurite glasses (based on tellurium oxide, $TeO_2$) were developed in the 1950s.

Prior art relating to rare earth aluminum oxide glasses includes Sedykh, et al. [Izvestiya Akademii Nauk SSSR, Neorganicheskie Materialy, Vol. 11, No. 6, pp. 1153–1154, 1975], who report glass forming compositions in the $Y_2O_3$—$Al_2O_3$—$SiO_2$ system. The glass forming composition with the least amount of $SiO_2$ that is reported by Sedykh, et al. contains 40.3 molar % $SiO_2$, 43.4 molar % $Al_2O_3$ and 16.3 molar % $Y_2O_3$. The glasses reported by Sedykh, et al. contain from 16 to 33 molar % $Y_2O_3$. Day and Ehrhardt, in U.S. Pat. No. 4,789,501, disclose glass microspheres containing aluminum oxide, yttrium oxide and silicon oxide. The compositions of the glass microspheres of Day and Ehrhardt, and of the bulk glasses of Sedykh, et al. are within a region of the ternary $Y_2O_3$—$Al_2O_3$—$SiO_2$ composition diagram that is given in weight percent and converted to molar percent in Table 1.

TABLE 1

Range Of Compositions Of Oxide Glasses Disclosed in U.S. Pat. No. 4,789,501

| Component | Weight Percent | | | | Molar Percent | | | |
| --- | --- | --- | --- | --- | --- | --- | --- | --- |
| | A | B | C | D | A | B | C | D |
| $SiO_2$ | 20 | 70 | 70 | 20 | 45 | 86 | 83 | 36 |
| $Al_2O_3$ | 10 | 10 | 20 | 45 | 13 | 7 | 14 | 47 |
| $Y_2O_3$ | 70 | 20 | 10 | 35 | 42 | 7 | 3 | 17 |

McPherson and Murray, in U.S. Pat. No. 5,747,397, also disclose glass containing rare earth oxides and aluminum oxide with additions of glass-forming agents and other oxides. The glasses disclosed by McPherson and Murray contain 30–70 molar % of oxide glass forming agents ($SiO_2$, $GeO_2$, $B_2O_3$, and $P_2O_5$), 0–25 molar % of $Al_2O_3$, 20–42 molar % of $RE_2O_3$ ($Y_2O_3$, $Er_2O_3$, $Nd_2O_3$, $La_2O_3$, $Gd_2O_3$, and $Yb_2O_3$), and 0–28 molar % of other oxides ($TiO_2$, $K_2O$, $ZrO_2$, $ZnO$, $Nb_2O_3$, and $Ga_2O_3$). The glasses claimed by McPherson and Murray contained from 48–66 molar % of $TiO_2+SiO_2+GeO_2+B_2O_3$, i.e., no more than 52 molar % of $Al_2O_3+RE_2O_3$. The compositions disclosed by McPherson and Murray contained no more than 55 molar % of $Al_2O_3+RE_2O_3$.

Eberlin, in U.S. Pat. 2,206,081 discloses optical glasses comprised of heavy metal oxides and $B_2O_3$ as the glass forming agent. The glasses disclosed by Eberlin contain 37–70 molar % of $B_2O_3$, no $Al_2O_3$, 10–32 molar % of $La_2O_3$, and 20–39 molar % of other oxides ($ThO_2$, $Ta_2O_5$, $ZrO_2$, $Na_2O$, and $LiNO_3$) Glass materials with compositions in the range 24 molar % to 32 molar % $Y_2O_3$ with the balance $Al_2O_3$ have been reported in the scientific literature. These yttrium oxide-aluminum oxide glasses occur as a heterogeneous mixture of two different glasses that form when the liquid is rapidly cooled. A glass of 37.5 molar % $Y_2O_3$ in $Al_2O_3$ has also been reported, but we show here that this glass is also a mixture of two different glasses.

All of the rare earth elements and aluminum exhibit an oxidation state of +3. Four-, six-, and eight-coordination ionic radii for these ions are given in FIG. 1. The horizontal lines in the figure are the cation radii for 4-, 6- and 8-coordination with $O^{-2}$ ions at which the coordinated $O^{-2}$ anions just touch, i.e., the "critical" radii for 4-, 6-, and 8-coordination with $O^{-2}$. According to Pauling's rules, the local coordination most likely to occur is that of the largest polyhedron for which the cation radius exceeds the critical radius.

The prior art also teaches that optical waveguides may be made from crystalline oxide materials, such as yttrium aluminum garnet (YAG) of composition $Y_3Al_5O_{12}$, with compositions similar to those of this invention.

Prior art glasses containing substantial amounts of rare earth oxides and aluminum oxide are either two phase glasses that are not suitable for optical applications, or they contain at least 30 molar % of the glass forming agents, $SiO_2$ and/or $B_2O_3$.

Thus there exists a need for glasses that may readily be configured into optical waveguide forms and dimensions to be used in applications concerning guiding light waves for the purpose of operating optical devices such as lasers and optical amplifiers.

It is, therefore, an object of the invention to provide a glass that can be used in optical applications where uniform mechanical and thermal properties are required.

Another object of the invention is to provide homogeneous, single phase glasses.

Yet another object of the invention is to provide glasses that have a high refractive index.

SUMMARY

Figure 1:
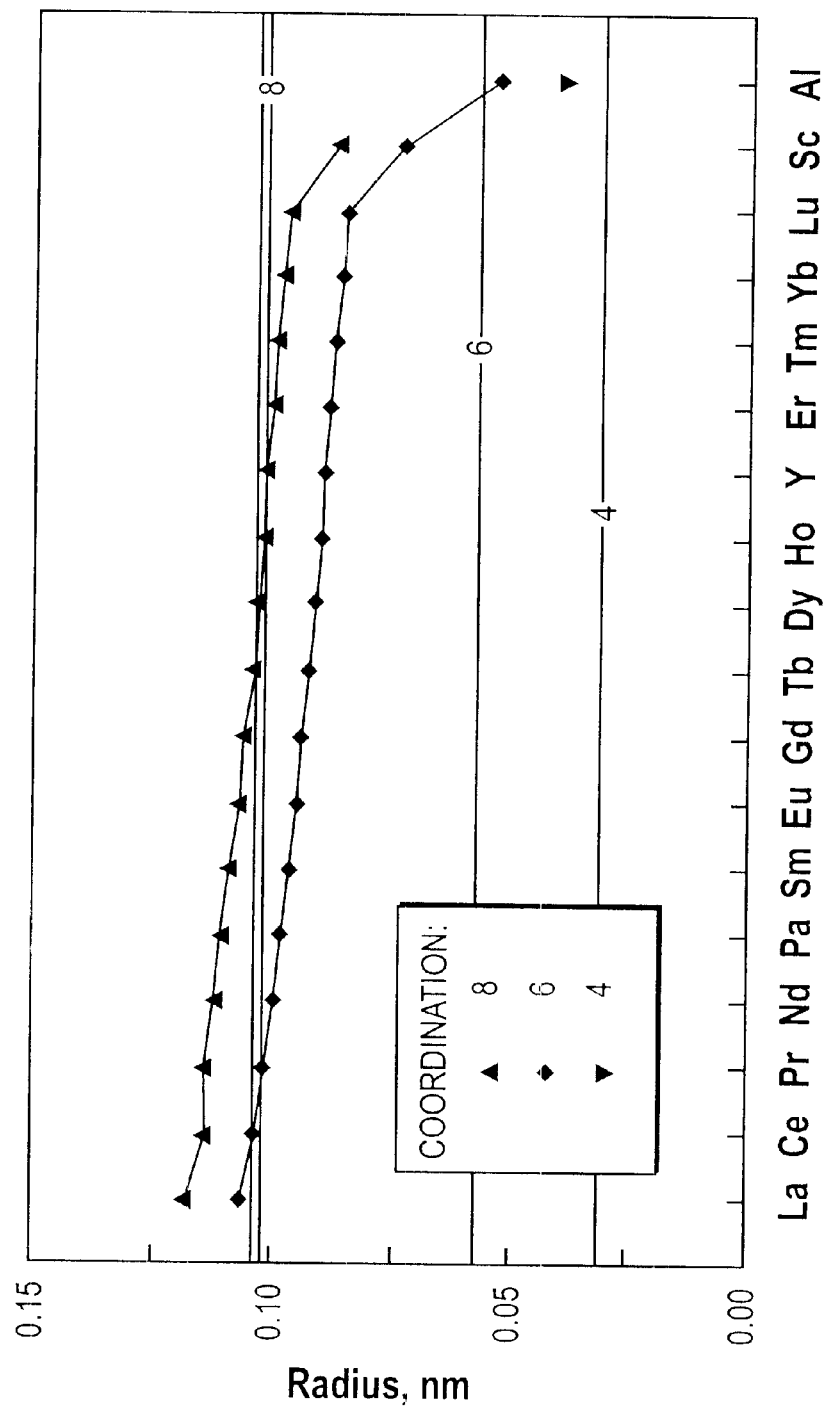
FIG. 1 shows the radii of trivalent rare earth and aluminum cations in 4-, 6-, and 8-coordination with $O^{-2}$ anions, and the critical radii for 4-, 6-, and 8-coordination with $O^{-2}$ anions.

The present invention is a bulk single phase glass comprising (i) rare earth oxides and aluminum oxide or (ii) rare earth oxides, aluminum oxide, and oxides that are glass forming agents such as silicon dioxide, with up to 15 molar % of other oxides added to these glasses. The composition range of the glasses of this invention that contain $RE_2O_3$ and $Al_2O_3$ but no conventional glass forming agents such as silicon dioxide is from about 23 to 50 molar % of $RE_2O_3$ and from 77 to 50 molar % of $Al_2O_3$. The composition range of the glasses of this invention that contain $RE_2O_3$, $Al_2O_3$, and silicon dioxide (or other oxides that are glass forming agents) lies substantially within a polygonal region of a ternary composition diagram of the rare earth oxide—aluminum oxide—silicon dioxide system where the region is defined by the range of compositions given in Table 2.

TABLE 2

| Composition Range, molar %, of Glasses of this Invention | | |
|---|---|---|
| $RE_2O_3$ | $Al_2O_3$ | $SiO_2$ |
| 1 | 59 | 40 |
| 1 | 71 | 28 |
| 23 | 77 | 0 |
| 50 | 50 | 0 |
| 50 | 0 | 50 |
| 33.33 | 33.33 | 33.33 |
| 16.67 | 50 | 33.33 |

DESCRIPTION OF INVENTION

The invention provides bulk forms of single phase glass made from materials containing oxides of aluminum and the rare earth elements. In the context of this invention, a "bulk single phase glass" means an amorphous material having macroscopic dimensions. The glass materials may exhibit variations in density, refractive index, chemical composition, or other physical and chemical properties over the dimensions of the glass material, but they may not exhibit discontinuities in these properties. They will have macroscopic dimensions, which as a practical matter means that the dimensions of the single phase glass exceed 0.01 cm in two orthogonal directions and 0.001 cm in the third orthogonal direction. These dimensions distinguish the bulk glasses of this invention from microscopic (non-bulk) glass materials such as fine particles, thin glass fibers, and thin amorphous coatings that may be formed by various means.

The glass materials disclosed in this invention were made by containerless techniques. The containerless techniques are a simple laboratory method to demonstrate glass formation, by eliminating contact between the melt and a solid container. This approach allows undercooling of the melt below the melting point of the crystalline phases and below the liquidus temperatures that occur in the oxide systems investigated. It avoids heterogeneous nucleation of crystalline material due to contact with a container, which would prevent the formation of glass.

The glass specimens were prepared by melting weighed mixtures of high purity $Al_2O_3$, $Er_2O_3$, $La_2O_3$, $Y_2O_3$ or small pieces of pure YAG crystals, other rare earth oxides, and oxides of other elements (obtained from Cerac, Inc., Milwaukee, Wis., U.S.A.) in a laser hearth melter. The compositions of the mixtures are presented in Tables 3 to 7. The hearth melting process formed spheroidal samples of 0.1–0.35 cm in diameter that were subsequently levitated and melted. Glass was formed when the molten samples were allowed to cool at a sufficient rate.

Levitation of the spheroidal samples was accomplished using an aero-acoustic levitator (AAL) or a conical nozzle levitator (CNL). The samples were levitated, heated by continuous wave $CO_2$ laser beam heating, melted, and the melt was held at a temperature above the melting point for a period of time from a few seconds up to more than one minute after melting, then cooled immediately by turning off the laser power, or cooled to a lower hold temperature for a few minutes before cooling to room temperature. Sample temperatures were measured with an optical pyrometer. The cooling rates were determined from the temperature versus time data.

The glass samples were examined under a binocular microscope at a magnification of 15–60 and, after preparing polished sections of the glass, under a metallurgical microscope at 50–200 magnification to determine if they were homogeneous (single phase). Some of the samples, with compositions close to the limits on composition at which single phase or two phase glasses were formed, were cut and polished to allow more precise examination under a microscope.

The containerless techniques are not a requirement for making the glass of the present invention since the oxide melts of interest may, for example, be supported on a liquid that (i) has a density greater than the oxide liquids, (ii) has a melting point below the glass transition temperature of the glass that is formed when the liquid oxide is cooled, and (iii) unlike solid containers, does not promote heterogeneous nucleation of crystalline material in the undercooled liquid oxides. Liquid tin has the required properties, and it is already widely used with prior art glass making as the supporting medium in float glass processes. Liquid gold may also be used to float the oxide liquids and glass materials of interest without contact with any solid material that would induce heterogeneous nucleation of crystals.

One method conceived for synthesis of large masses of the glass materials of this invention is:

(i) Melting the glass-forming oxide mixtures by heating to a desired temperature, typically above 2000° C. (Iridium is the preferred crucible material for melting of rare earth oxides and aluminum oxide.);

(ii) Heating and melting a pool of liquid gold or tin contained in a suitable melting crucible at a temperature above the melting point of the gold (1063° C.) or the tin (232° C.); and (iii) Pouring the liquid oxide onto the liquid gold or tin to cool the oxide and form a mass of glass that floats on the liquid metal.

A second method to process larger masses of glass materials is to melt the glass forming oxide mixture in a crucible and cast the liquid oxide into a cooled metal die. It is possible that heterogeneous nucleation of crystals will occur at the glass surface where the liquid comes into contact with the die. However, if the cooling rate is large enough, i.e., if the casting is thin enough, glass will be formed before the crystals propagate through the casting thickness. Such crystals can be later removed by polishing of the surface to obtain a homogeneous glass product.

A third method to process larger masses of glass materials is to use the gas film levitation method developed by Granier and Potard [J. Granier and C. Potard, Proc. 6th Eur. Symp. Micrograv. Bordeaux, France, ESA SP-256 (1987), pp. 421–25, see also U.S. Pat. Nos. 4,620,587, 4,617,084, 4,546,811, 4,539,173, 4,197,273, and 4,096,024, incorporated herein by reference]. The sample is levitated by floating on a thin gas film formed by gas flow through a porous membrane. A furnace or EM heated graphite susceptor may be used to achieve high temperatures.

The glasses of the present invention are comprised of the oxides of aluminum and one or more of the seventeen rare earth elements. These eighteen elements are present in the glasses as ions with a +3 charge. Four of these ions, $Al^{+3}$, $Sc^{+3}$, $Y^{+3}$, and $La^{+3}$, have electronic configurations equivalent to the rare gases, Ne, Ar, Kr, and Xe, respectively, except that the charge on the nucleus of the ion is three units greater than that of the corresponding rare gas. A fifth rare earth ion, $Lu^{+3}$, has an electronic configuration similar to Xe, except that it includes a filled f-shell of electrons that is not optically active. Therefore, these five ions have optical properties similar to the rare gases, and glasses formed from the oxides of these ions will be transparent from the ultraviolet to the mid-infrared region of the spectrum. The other thirteen rare earth ions that comprise the oxides used in the glasses of this invention have unpaired electrons in the 4f shell of electrons that lead to optical absorption within the ultraviolet to mid-infrared region of the spectrum.

Aluminum, yttrium, and lanthanum are relatively abundant and inexpensive elements, while scandium and lutetium are relatively rare and expensive elements. The preferred embodiment of the invention is therefore a glass that is comprised of aluminum oxide and oxides of yttrium and/or lanthanum. Other rare earth oxides may be substituted for the yttrium oxide and/or lanthanum oxide. The glass may include additives of other oxides used to modify the processing characteristics and properties of the glass. The total concentration of these other oxides should be no more than 33 molar %, and preferably no more than 20 molar %.

The present invention is further defined in the following examples. It should be understood that these examples, while indicating various embodiments of the invention, are given by way of illustration only.

FIRST SET OF EXAMPLES

Table 3 summarizes the compositions of glasses prepared from mixtures of $Al_2O_3$, $Y_2O_3$, $Er_2O_3$, $La_2O_3$, and $Nd_2O_3$ in a first series of experiments. The table includes the molar percentages of the components, the cooling rates at which the glasses were formed (which were greater for smaller diameter samples), and whether the compositions were single phase. The cooling rates were determined in the temperature range from 1300–1400 K. Crystallization occurred spontaneously in the undercooled melts, at a temperature of approximately 1300 K, if the cooling rate was not sufficient to achieve glass formation. Examples I-A through I-S of Table 3 show compositions that resulted in a two-phase glass. The presence of two phases in the glass samples is undesirable for optical applications because it results in random scattering, reduced transmission, and distortion of the light traveling through the glass.

TABLE 3

Rare Earth Oxide - Aluminum Oxide Glass Compositions
Balance $Al_2O_3$ in all cases. * - estimated value

| Example | Molar Percentages of Components | | | | Cooling rate to form glass, ° C./s | Single Phase |
|---|---|---|---|---|---|---|
| | $Y_2O_3$ | $Er_2O_3$ | $La_2O_3$ | $Nd_2O_3$ | | |
| I-A | 37.5 | | | | 100–150 | No |
| I-B | 42.0 | | | | 100–150 | No |
| I-C | 23.0 | | | | 100–120* | No |
| I-D | 37.4 | 0.1 | | | 80–130 | No |
| I-E | 36.5 | 1.0 | | | 100–150* | No |
| I-F | 32.5 | 5.0 | | | 80–120 | No |
| I-G | | 37.5 | | | 150–200* | No |
| I-H | 37.4 | | | 0.1 | 75–120 | No |
| I-J | 36.5 | | | 1.0 | 100–150 | No |
| I-K | 32.5 | | | 5.0 | 80–120 | No |
| I-L | 37.4 | | 0.1 | | 100–150 | No |
| I-M | 37.0 | | 0.5 | | 100–150 | No |
| I-N | 36.5 | | 1.0 | | 100–150 | No |
| I-O | 35.5 | | 2.0 | | 100–120 | No |
| I-P | 34.0 | | 3.5 | | 80–130 | No |
| I-Q | | 32.5 | 5.0 | | 120* | No |
| I-R | 32.5 | | 5.0 | | <80 | No |
| I-S | 18.75 | 13.75 | 5.0 | | <100* | No |
| I-T | 27.5 | | 5.0 | 5.0 | <90 | Yes |
| I-U | | 30.5 | 7.0 | | <90 | Yes |
| I-V | 27.5 | | 10.0 | | <100 | Yes |
| I-W | 12.5 | 12.5 | 12.5 | | <70 | Yes |

TABLE 3-continued

Rare Earth Oxide - Aluminum Oxide Glass Compositions
Balance $Al_2O_3$ in all cases. * - estimated value

| Example | Molar Percentages of Components | | | | Cooling rate to form glass, °C./s | Single Phase |
|---|---|---|---|---|---|---|
| | $Y_2O_3$ | $Er_2O_3$ | $La_2O_3$ | $Nd_2O_3$ | | |
| I-X | | | 37.5 | | <90 | Yes |
| I-Y | | 10.0 | 40.0 | | 100* | Yes |
| I-Z | | | 50.0 | | <90 | Yes |
| I-AA | 27.0 | | | | <80 | Yes |
| I-AB | 30.0 | | 7.0 | 0.5 | <120* | Yes |
| I-AC | 28.5 | | 9.0 | | <120* | Yes |

Examples I-T through I-AC show compositions that resulted in a single phase glass. The single phase glasses showed no evidence of phase separation either in visible light transmission or by microscopic examination at magnifications of 15–60. The single phase glasses are brilliant, clear and transparent or colored and have excellent light transmission outside the absorption bands of the colored glasses. The Er-containing glasses were pink-colored and the Nd-containing glasses were blue.

All but five of the compositions in Table 3 contain a ratio of aluminum oxide and rare earth oxides of 5:3, i.e., 62.5 molar % $Al_2O_3$ and 37.5 molar % of combined rare earth oxides as $RE_2O_3$. Examples I-B and I-C demonstrate the upper and lower limit respectively of yttrium oxide concentrations for $Al_2O_3$:$Y_2O_3$ compositions for which glass was obtained, i.e., from 42 to 23 molar % $Y_2O_3$ (58–77 molar % $Al_2O_3$). A small part of this composition range, near 27 molar % $Y_2O_3$ (73 molar % $Al_2O_3$) formed a single phase glass, as shown by example I-AA. Examples I-Y and I-Z demonstrate single phase glasses containing $La_2O_3$, with 50 molar % $RE_2O_3$ and 50 molar % $Al_2O_3$.

Examples I-T to I-AC demonstrate that single-phase glass can be obtained at $RE_2O_3$:$Al_2O_3$ ratios in the range from 27:73 (Example I-AA) to 1:1 (Examples I-Y and I-Z). The single phase glasses contain a molar percentage of $La_2O_3$ that increases with the $RE_2O_3$:$Al_2O_3$ ratio. Thus, at $RE_2O_3$:$Al_2O_3$=27/73, 3/5, and 1/1, the $La_2O_3$ content at which single phase glass was obtained equals 0, at least 5, and at least 40 molar percent, respectively. We conclude that addition of $La_2O_3$ to compositions over the full range of glass formation will allow single phase glass to be obtained, and that the lower limit for the $RE_2O_3$:$Al_2O_3$ ratio at which single phase glass can be made is therefore at or below a value equal to 23:77, as given by example I-C. In summary, we have found that a single phase glass can be produced from a melt having a composition of 23–50 molar % $RE_2O_3$ and 77–50 molar % $Al_2O_3$, where 0–50 molar % of the rare earth oxide—aluminum oxide mixture is $La_2O_3$.

Cooling Rate Data

All of the cooling rates given in Table 3 exceed the critical cooling rate for glass formation, $R_c$. $R_c$ is defined as the minimum cooling rate at which glass can be formed free from crystalline material that can spontaneously nucleate in the undercooled liquid. Where a range of values or a single specific value is given for the cooling rate, crystallization was observed at slower cooling rates, i.e., the value of Rc was somewhat less than the minimum cooling rate given in the Table. Where an upper limit is given for the cooling rate, the cooling rates are an upper limit on $R_c$ because smaller cooling rates were not achieved in the free-cooling experiments that were performed. These samples did not crystallize at any cooling rate achieved in the experiments. Estimated values of the cooling rate (marked with an asterisk) are given where the temperature versus time was not measured during the experiments. The results in Table 3 show that in general the value of $R_c$ decreases with an increase in the lanthanum content of the glass.

Second Set of Examples

Table 4 presents the compositions of glasses prepared from mixtures of $Al_2O_3$, $Y_2O_3$, $La_2O_3$, and ten other rare earth oxides. Examples II-A to II-R in Table 4 demonstrate that a single phase rare earth oxide—aluminum oxide glass can be formed from compositions consisting essentially of 37.5 to 38.5 molar % rare earth oxides as $RE_2O_3$ and 61.5 to 62.5 molar % $Al_2O_3$. Rare earth oxides not included in the table are oxides of Ce, Pm, Gd, Dy, and Lu. However, because the properties of these elements are very similar to the properties of rare earth elements that were used, it is evident that these other rare earth oxides may also be used to form the single phase glasses of this invention. Examples II-S and II-T show additional compositions that formed two-phase glasses.

TABLE 4

Rare Earth Oxide - Aluminum Oxide Glass Compositions

| Example | Chemical Composition, Molar Percent | | | | | Single Phase |
|---|---|---|---|---|---|---|
| | $Y_2O_3$ | $La_2O_3$ | $Al_2O_3$ | Other $RE_3O_3$ | | |
| II-A | 16.5 | 10 | 62.5 | 1 $Er_2O_3$ | 10 $Yb_2O_3$ | Yes |
| II-B | 11 | 10 | 62.5 | 1.5 $Er_2O_3$ | 15 $Yb_2O_3$ | Yes |
| II-C | 6.6 | 10 | 62.5 | 1 $Er_2O_3$ | 20 $Yb_2O_3$ | Yes |
| II-D | 5.5 | 10 | 62.5 | 2 $Er_2O_3$ | 20 $Yb_2O_3$ | Yes |
| II-E | | 25 | 62.5 | 12.5 $Sc_2O_3$ | | Yes |
| II-F | 29.5 | 7 | 62.5 | 1 $Pr_2O_3$ | | Yes |
| II-G | 29 | 7 | 62.5 | 1.5 $Pr_2O_3$ | | Yes |
| II-H | 27.5 | 7 | 62.5 | 3 $Pr_2O_3$ | | Yes |
| II-J | 30.5 | 7 | 61.5 | 1 $Yb_2O_3$ | | Yes |
| II-K | 30.5 | 7 | 61.5 | 1 $Tm_2O_3$ | | Yes |
| II-L | 30.5 | 7 | 61.5 | 1 $Er_2O_3$ | | Yes |
| II-M | 30.5 | 7 | 61.5 | 1 $Ho_2O_3$ | | Yes |
| II-N | 30.5 | 7 | 61.5 | 1 $Tb_2O_3$ | | Yes |
| II-O | 30.5 | 7 | 61.5 | 1 $Eu_2O_3$ | | Yes |
| II-P | 30.5 | 7 | 61.5 | 1 $Sm_2O_3$ | | Yes |
| II-Q | 30.5 | 7 | 61.5 | 1 $Nd_2O_3$ | | Yes |
| II-R | 30.5 | 7 | 61.5 | 1 $Pr_2O_3$ | | Yes |
| II-S | 30.25 | | 58.0 | 4.5 $Sc_2O_3$ | 7.25 $Yb_2O_3$ | No |
| II-T | | | 62.5 | 37.5 $Yb_2O_3$ | | No |

Third Set of Examples

Table 5 presents data for a third set of glass samples, both those that underwent phase separation and those that did not. These glass samples were polished and examined under a metallurgical microscope at a magnification of 50–200 to more precisely examine the material for the presence of a second glass phase.

TABLE 5

Phase Separation In Polished Glass Specimens
\* - estimated value

| Example | Chemical Composition Molar Percent | | | | Diam. mm | Cooling Rate °C./s | Single Phase | Color |
|---|---|---|---|---|---|---|---|---|
| | $Al_2O_3$ | $Y_2O_3$ | $La_2O_3$ | $RE_2O_3$ | | | | |
| III-A | 62.5 | 30.5 | 7 | | 3.5 | 100* | No | Clear |
| III-B | 62.5 | 30.5 | 7 | | 3 | 125 | No | Clear |
| III-C | 62.5 | 30.5 | 7 | | 2.5 | 140 | No | Clear |
| III-D | 62.5 | 30.5 | 7 | | 2 | 175 | Yes | Clear |
| III-E | 62.5 | 30.5 | 7 | | 1.5 | 300 | Yes | Clear |
| III-F | 62.5 | 29.5 | 7 | 1 $Yb_2O_3$ | 3.6 | 95* | No | Clear |
| III-G | 62.5 | 29.5 | 7 | 1 $Er_2O_3$ | 3.4 | 105* | No | Pink |
| III-H | 62.5 | 29.5 | 7 | 1 $Tb_2O_3$ | 3.2 | 115* | No | Yellow |
| III-J | 62.5 | 29.5 | 7 | 1 $Eu_2O_3$ | 3.0 | 125* | Yes | Yellow |
| III-K | 62.5 | 29.5 | 7 | 1 $Pr_2O_3$ | 3.0 | 125* | No | Yellow |
| III-L | 62.5 | 29.5 | 7 | 1 $Sm_2O_3$ | 2.7 | 135* | Yes | Clear |
| III-M | 62.5 | 29.5 | 7 | 1 $Ho_2O_3$ | 2.5 | 140* | Yes | Pink |
| III-N | 62.5 | 29.5 | 7 | 1 $Nd_2O_3$ | 2.5 | 140* | Yes | Blue |
| III-O | 62.5 | 29.5 | 7 | 1 $Tm_2O_3$ | 2.4 | 145* | Yes | Clear |

In examples III-A through III-E the ratio of $Al_2O_3$ to total $RE_2O_3$ was 5:3, with 7 molar % $La_2O_3$ and 30.5 molar % $Y_2O_3$. These samples were prepared from liquid drops of different diameters that exhibited a range of cooling rates as shown in the table. It can be seen that some phase separation could be observed in the larger glass samples which formed at smaller cooling rates. Small particles of the second glass phase were observed near the center of the samples, where the sample cooled at a slightly smaller rate than was measured at the sample surface and is reported in the Table. The size of the second phase particles decreased as the cooling rate increased, and no second phase was be observed at cooling rates equal to or greater than 175° C./s.

Glass samples III-F through III-O were of the same composition except for the substitution of 1 molar % of Yb, Er, Tb, Eu, Pr, Sm, Ho, Nd, and Tm oxides for an equal amount of the $Y_2O_3$ content of the samples. In examples III-F to III-O, two each of the various glass materials were prepared and examined, to obtain the results stated in the column labeled "Single Phase". As with examples III-A to III-E, the observation of phase separation correlates with the sample size, i.e., with the cooling rate. In all examples, larger cooling rates gave single phase samples as determined by the microscopic examination of polished glass samples. It is evident that a slight further increase in the cooling rate or in the lanthanum content of the samples will allow single phase glass to be obtained for samples containing 1 molar % of Yb, Er, Tb, Eu, Pr, Sm, Ho, Nd and Tm oxides and $RE_2O_3$:$Al_2O_3 \approx 3:5$.

Fourth Set of Examples

Table 6 presents the compositions of single phase glasses prepared from mixtures of $Al_2O_3$, $Y_2O_3$, $La_2O_3$, $Er_2O_3$, and the non-rare earth oxides CaO, $TiO_2$, $SiO_2$, and $ZrO_2$. Examples IV-A to IV-M demonstrate that a bulk single phase glass can be formed from compositions comprising 1.0 to 50 molar % $RE_2O_3$, 0 to 71 molar % $Al_2O_3$, 0 to 35 molar % $SiO_2$, and 0 to 15 molar % other oxides. Since $SiO_2$ can have a deleterious effect on the optical properties of the glass, preferably the total concentration of $SiO_2$ is less than 35 molar %, and optimally the concentration of $SiO_2$ is zero. Alternatively, a useful bulk single phase glass has been obtained where the total concentration of $RE_2O_3$ and $Al_2O_3$ is at least 55 molar %. The table includes cooling rates measured for examples IV-E, IV-F, IV-J, IV-K, and IV-L.

TABLE 6

Single Phase Glass Compositions

| Example | Chemical Composition Molar Percent | | | | | | Cooling Rate °C./s |
|---|---|---|---|---|---|---|---|
| | $Y_2O_3$ | $La_2O_3$ | $Er_2O_3$ | $Al_2O_3$ | $SiO_2$ | Other Oxides | |
| IV-A | 17.5 | 10 | | 57.5 | | 10 CaO, 5 $ZrO_2$ | |
| IV-B | 9.5 | 10 | 8 | 62.5 | | 5 TiO2, 5 $ZrO_2$ | |
| IV-C | 30.5 | 5 | 2 | 42.5 | 20 | | |
| IV-D | 37.5 | | | 50 | 12.5 | | |
| IV-E | 1.0 | | | 59 | 40 | | 300 |
| IV-F | 1.0 | | | 71 | 28 | | 800 |
| IV-G | 40 | | | 30 | 30 | | |
| IV-H | 50 | | | 25 | 25 | | |
| IV-J | 50 | | | | 50 | | 800 |
| IV-K | 33.3 | | | 33.3 | 33.3 | | <100 |
| IV-L | 16.7 | | | 50 | 33.3 | | <100 |
| IV-M | 29.0 | 3.0 | | 66.0 | | 2 $TiO_2$ | |

Composition Range of Single Phase Glasses

Figure 2:
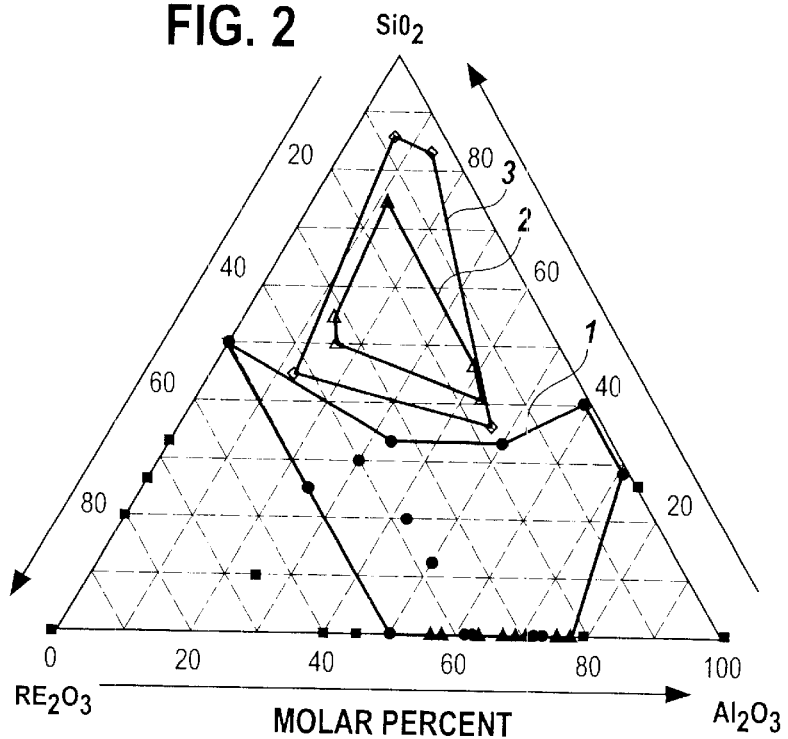
FIG. 2 is a ternary composition diagram showing the compositions of glasses formed from mixtures of rare earth oxides, aluminum oxide, and silicon dioxide.

FIG. 2 is a ternary composition diagram that illustrates the chemical compositions in molar % of single phase glasses formed from $RE_2O_3$, $Al_2O_3$, and $SiO_2$. Compositions of single phase glasses disclosed here are shown as filled circles. Compositions of two-phase glasses that will yield single phase glasses when the $RE_2O_3$ content includes sufficient $La_2O_3$ are shown as filled diamonds. Compositions that did not yield glass but instead crystallized upon cooling of the liquid are shown as filled squares. Outlined region 1 in FIG. 2 illustrates the range of compositions for the single phase glasses of this invention. Prior art glasses reported by Sedykh, et al. are shown as open triangles and outlined region 2. Compositions of prior art glasses of Day and Ehrhardt (U.S. Pat. No. 4,789,501) are shown as open diamonds and outlined region 3. Not all of the compositions of the prior art glasses are shown in the figure, but all of the compositions of these glasses were within the borders 2 and 3 drawn by connecting the compositions that are presented in the figure.

Figure 3:
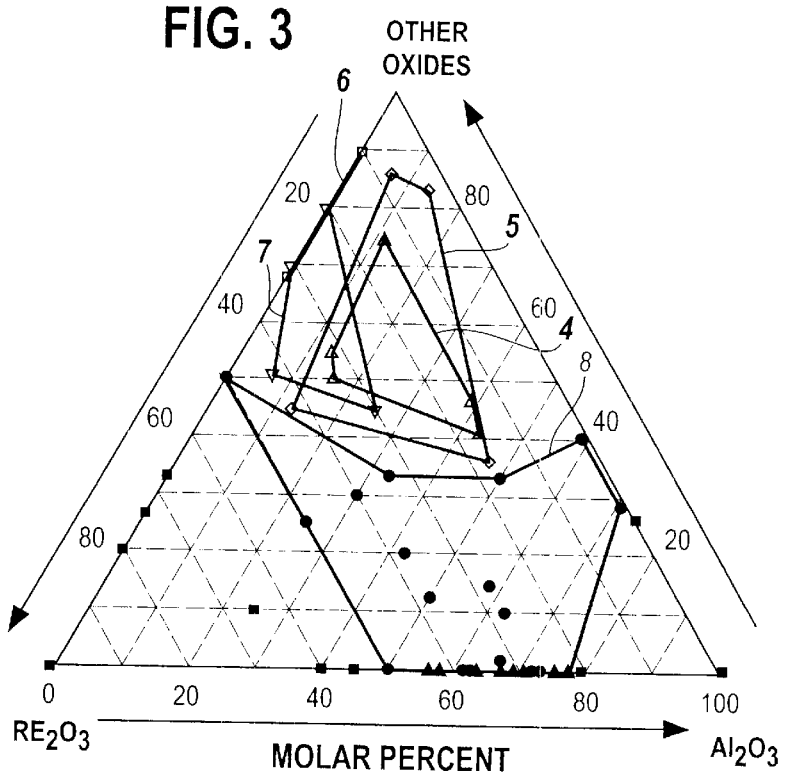
FIG. 3 is a ternary composition diagram showing the molar compositions of glasses formed from mixtures of rare earth oxides, aluminum oxide, and other oxides.

FIG. 3 is a ternary composition diagram that shows the ranges of molar percentages of rare earth oxides, aluminum oxide, and all other oxides contained in the glasses disclosed here and in prior art glasses. Border 4 represents the glasses disclosed by Sedykh, et al., comprised of $Y_2O_3$, $Al_2O_3$, and $SiO_2$. Border 5 represents the glasses disclosed by Day and Ehrardt, also comprised of $Y_2O_3$, $Al_2O_3$, and $SiO_2$. Border 6 represents the glasses disclosed by Eberlin, comprised of $La_2O_3$, $B_2O_3$, $Ta_2O_5$, $ThO_2$, $ZrO_2$, $LiNO_3$, and $Na_2O$. Border 7 represents the glasses disclosed by McPherson and Murray, which comprised Al2O3, the rare earth oxides, $Y_2O_3$, $Er_2O_3$, $Nd_2O_3$, $La_2O_3$, $Gd_2O_3$, and $Yb_2O_3$, the glass forming agents, $SiO_2$, $B_2O_3$, $GeO_2$, and $P_2O_5$, and other oxides $TiO_2$, $K_2O$, $ZrO_2$, $ZnO$, $Ga_2O_3$, and $Nb_2O_5$. Border 8 represents the glasses disclosed here, which comprised $Al_2O_3$, the rare earth oxides $Sc_2O_3$, $Y_2O_3$, $La_2O_3$, $Pr_2O_3$, $Nd_2O_3$, $Sm_2O_3$, $Eu_2O_3$, $Gd_2O_3$, $Tb_2O_3$, $Ho_2O_3$, $Er_2O_3$, $Tm_2O_3$, and $Yb_2O_3$, the glass forming agent, $SiO_2$, and other oxides CaO, $ZrO_2$, and $TiO_2$. The CaO, $ZrO_2$, and $TiO_2$ were used in amounts up to 15 molar % of the glasses. The filled circles, diamonds, and squares represent compositions of single phase glasses, two phase glasses, and liquids that crystallized upon cooling of the liquid and did not form glass, respectively.

Relationship Between Cooling Rates and Glass Composition

The cooling rates employed to investigate glass formation from pure $Y_2O_3$—$Al_2O_3$ compositions (see Table 2, Examples I-A to I-C and I-AA) were no greater than 150° C./s. Crystallization of the melt always occurred outside the range of compositions (from 23 to 42 molar % $Y_2O_3$) for which glass was obtained when the melt was cooled at a rate less than 150° C./s. It is evident that the range of compositions for which glass was formed was limited by the cooling rate achieved in the glass synthesis experiments and that this range can be increased if means to increase the cooling rate are employed. Formation of glass from compositions containing at least 5 molar % $La_2O_3$ did not encounter limitations due to crystallization at the cooling rates that were used. The composition range of $RE_2O_3$—$Al_2O_3$ glasses can be extended by using $La_2O_3$ concentrations that were not investigated and by using larger cooling rates during the glass forming process.

It is known that, for oxide glass and metallic glass, a reduction in critical cooling rate, $R_c$, for glass formation may be obtained by adding multiple components to the glass-forming melt. In this way, a lower melting composition, such as a eutectic, can occur, allowing a lowering of the liquidus temperature and achieving glass formation before the liquid is sufficiently undercooled that crystallization occurs in the melt. Such a eutectic occurs in the $Y_2O_3$—$Al_2O_3$—$SiO_2$ system and contributes to the reduced cooling rates at which glass was obtained in Examples IV-K and IV-L relative to Examples IV-E, IV-F, and IV-J.

Means to increase the cooling rate and extend the composition range in which single phase glasses of this invention may be made would include using smaller diameter or thinner molten regions that achieve more rapid cooling rates. Increased cooling rates can also be obtained, without inducing heterogeneous nucleation, by pouring the liquid onto the surface of a cooler liquid such as liquid tin (melting point 505 K) or liquid gold (melting point 1336 K), or by diecasting.

Fifth Set of Examples

Single- and two-phase glass compositions selected from Tables 3–5 with $RE_2O_3$:$Al_2O_3$=3:5 are given in Table 7. The table also gives the average radius of trivalent rare earth ions, 8-coordinated with $O^{-2}$, for each composition. The example numbers are given in the first column, where it may be seen that one new example V-A is included. This glass, of composition $Gd_2O_3$:$Al_2O_3$=3:5 was prepared after the correlation of average radius with single- and two-phase glass formation was discovered in the previous results.

TABLE 7

Selected Compositions That Form Single Or Two-phase Glasses (62.5 molar % $Al_2O_3$ in all cases)

| Ex- | Chemical Composition, Molar % | | | Ave. RE | |
|---|---|---|---|---|---|
| ample | $La_2O_3$ | $Y_2O_3$ | Other $RE_2O_3$ | radius, | Phases |
| II-T | | | 37.5 $Yb_2O_3$ | 0.0858 | 2 |
| I-G | | | 37.5 $Er_2O_3$ | 0.0881 | 2 |
| I-A | | 37.5 | | 0.0892 | 2 |
| I-F | | 32.5 | 5 $Er_2O_3$ | 0.1013 | 2 |
| I-A | | 37.5 | | 0.1015 | 2 |
| I-Q | 5.0 | | 32.5 $Er_2O_3$ | 0.1024 | 2 |
| I-S | 5.0 | 18.75 | 13.75 $Er_2O_3$ | 0.1028 | 2 |
| I-P | 3.5 | 34.0 | | 0.1030 | 2 |
| I-R | 5.0 | 32.5 | | 0.1037 | 2 |
| II-D | 10.0 | 5.5 | 2.0 $Er_2O_3$  20 $Yb_2O_3$ | 0.1040 | 1 |
| II-C | 10.0 | 6.5 | 1.0 $Er_2O_3$  20 $Yb_2O_3$ | 0.1040 | 1 |
| I-U | 7.0 | 30.5 | | 0.1046 | 1 |
| I-T | 5.0 | 27.5 | 5.0 $Nd_2O_3$ | 0.1051 | 1 |
| I-AC | 9.0 | 28.5 | | 0.1055 | 1 |
| I-V | 10.0 | 27.5 | | 0.1059 | 1 |
| V-A | | | 37.5 $Gd_2O_3$ | 0.106 | 1 |
| I-W | 12.5 | 12.5 | 12.5 $Er_2O_3$ | 0.1065 | 1 |
| II-E | 25.0 | | 12.5 $Sc_2O_3$ | 0.1077 | 1 |
| I-X | 37.5 | | | 0.1180 | 1 |

The results in Table 7 show that the two-phase and single phase glasses occur in two groups for which the average radius values are less or greater, respectively, than approximately 0.1039 nm. This value is very close to the "critical radius" for 8-coordination with $O^{-2}$ ions, 0.1020 nm, where the oxygen ions surrounding an 8-coordinated cation just touch. It follows, therefore, that the tendency to form a single phase glass from mixtures of rare earth oxides and aluminum oxide is greater if the average rare earth ion radius is large enough to favor 8-coordination with oxygen ions.

A useful rule is thus obtained to guide the choice of single phase compositions that will form single phase glasses. For example, according to the ion radii given in FIG. 1, binary mixtures of $Al_2O_3$ with oxides of La through Tb, with $RE_2O_3$:$Al_2O_3 \approx 3:5$, should yield single phase glasses if the liquid is cooled at a rate sufficient to avoid spontaneous crystallization. This conclusion was verified by example V-A. Single-phase glasses containing the oxides of Dy through Lu, Y, and Sc, would require addition of one or more of the oxides from La to Tb. The minimum amounts of the added rare earth oxides can be estimated from the ion radii given in FIG. 1.

Properties of the Glasses

Properties of the novel glasses of this invention are discussed below. It is already known that the two-phase glass of the $Y_3Al_5O_{12}$ composition begins to crystallize when it is heated to a temperature of approximately 1250 K, which is close to the estimated value of the glass transition temperature. The bulk modulus measured for this glass is 108±2.5 GPa, and the shear modulus is 54±1.2 GPa. Since the chemical bonding is similar in the whole family of glasses, similar high moduli would be expected for the other glass compositions. The bulk and shear moduli of these glasses are large compared with prior art glasses.

The Vickers hardness of glasses containing 37.5 molar % $La_2O_3$+62.5 molar % $Al_2O_3$ is in the range 670–730. The Vickers hardness values for glass compositions containing 62.5 molar % $Al_2O_3$, balance $La_2O_3$ and $Y_2O_3$ are in the range 800–900 for 3.5 and 5 molar % $La_2O_3$, and 850–880 for 10 molar % $La_2O_3$.

The results given in Tables 3 to 7 show that the glasses of this invention may contain a wide range of optically active rare earth dopant concentrations in a host composition comprised of optically transparent components. The erbium and neodymium ions in these glasses are important optically active components used, for example, in erbium doped fiber amplifiers or Nd:YAG lasers that have broad commercial applications. Rare earth ions that exhibit laser action when doped into glass hosts include trivalent ions of praseodymium, neodymium, promethium, samarium, terbium, holmium, erbium, thulium, and ytterbium. It is well known that liberal substitution of the rare earths for each other is possible in the crystal lattice sites of minerals. The substitution property of rare earths for each other makes it possible to prepare single phase glasses of this invention that are doped with a wide range of concentrations of these laser-active rare earth ions, either singly or in combination.

Figure 4:
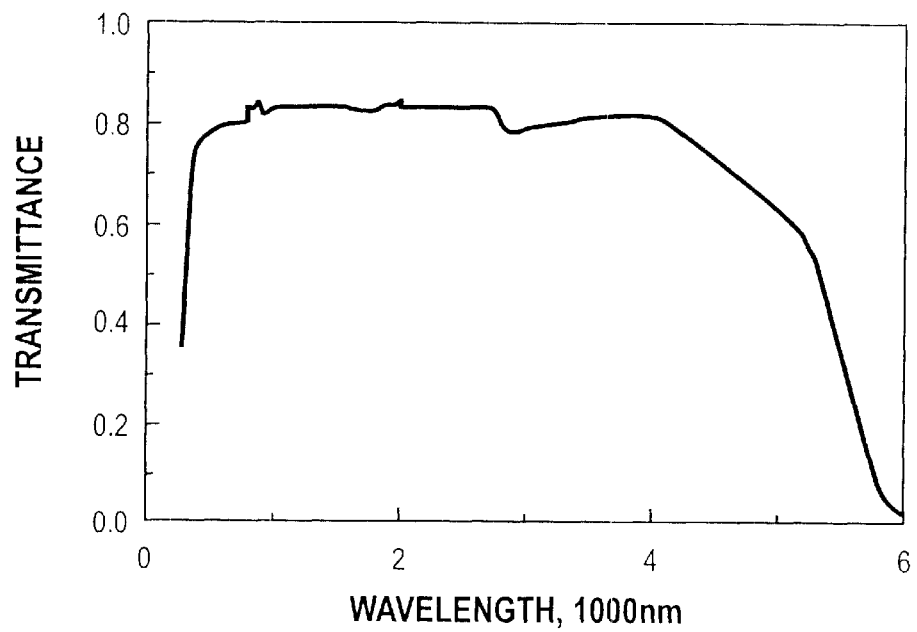
FIG. 4 shows the optical transmission of single phase glass of a composition comprised of 37.5 molar % $La_2O_3$ and 62.5 molar % $Al_2O_3$.
Figure 5:
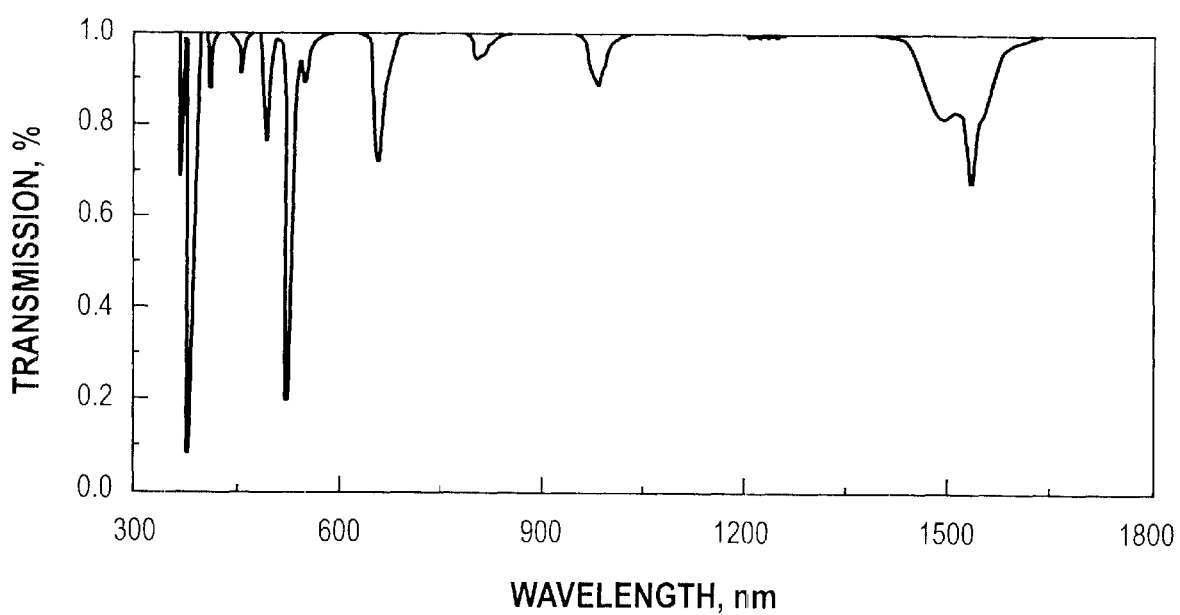
FIG. 5 shows the optical absorption spectrum of $Er^{+3}$ ions in a single phase glass containing 1 molar % $Er_2O_3$, 7 molar % $La_2O_3$, 30.5 molar % $Y_2O_3$ and 61.5 molar % $Al_2O_3$.

FIG. 4 illustrates the optical transmission of a glass containing 37.5 molar % $La_2O_3$+62.5 molar % $Al_2O_3$, i.e., the glass of example I-X. All of the single phase glasses prepared from aluminum oxide, yttrium oxide, and lanthanum oxide exhibited nearly identical transmission over the wavelength range shown in FIG. 4. It can be seen that high transmission occurs at wavelengths up to 5.0 $\mu$m. The transmission of glasses containing the oxides of Er, Nd, Eu, Pr, Yb, Tm, Ho, and Sm showed absorption spectra characteristic of the +3 ions of these optically active rare earth elements. For example, FIG. 5 illustrates the absorption spectrum of $Er^{+3}$ ions in a thin section from sample II-L that was cut and polished on both sides. The absorption spectrum shown in FIG. 5 is corrected for the non-unit transmission at all wavelengths due to reflection losses and absorption of the host glass at the ultraviolet end of the spectrum.

The infrared transmission of the glass that is illustrated in FIG. 4, is comparable to that of sapphire and it extends beyond the infrared cut-off wavelength of silica-based glasses. However, unlike sapphire, these glasses are isotropic materials that will not exhibit birefringence. Sapphire is birefringent, i.e., the polarization state of light changes upon transmission through a sapphire window. The absence of birefringence makes the glasses of this invention superior to sapphire for use in applications involving polarized light.

The refractive index, n, of the glass whose transmission is shown in FIG. 4 can be calculated from the maximum transmission, which was equal to approximately 84% at a wavelength of 880 nm. The less than total transmission occurs because each surface of the polished glass disk used in the transmission measurements reflects a small fraction of the light. The reflection coefficient, r, is determined by the refractive index according to the equation $r=(n-1)^2/(n+1)^2$. The transmission, $\tau$, of the glass sample is then obtained from the equation $\tau=(1-r)^2$. Using $\tau=0.84$ we obtain r=0.083 and a value of 1.81 for the refractive index.

Thus, the novel glasses of this invention present many opportunities to achieve technologically useful properties, either singly or in combinations, that are not available in prior art glasses. These useful properties include, for example, high hardness, high solubility of optically active ions, high softening temperature, high transmission at infrared wavelengths, high refractive index relative to typical silica-based optical glasses, high glass transition temperature, high modulus, and insensitivity to gases such as water vapor that are present in the atmosphere.

We anticipate that there are many compositions and variations within the composition ranges from which we have demonstrated formation of single phase glasses and which will be useful in various applications relating to optical materials, structural materials, hard non-crystalline materials and other areas where oxide glasses are used. Based on the results disclosed herein, extensions and modifications to compositions which might be envisioned and implemented within this family of glass materials would be obvious to those skilled in the art of glass making.

We claim:

1. A bulk single phase glass comprising:
   (a) 27 to 50 molar % $RE_2O_3$; and
   (b) 50–73 molar % $Al_2O_3$,
   where RE is one or more elements selected from the group consisting of Sc, Y, La, Ce, Pr, Nd, Pm, Sm, Eu, Gd, Tb, Dy, Ho, Er, Tm, Yb and Lu.

2. The glass of claim 1 comprising at least 5 molar % $La_2O_3$.

3. The glass of claim 1 wherein 0–50 molar % of the glass is $La_2O_3$.

4. The glass of claim 1 wherein RE is one or more elements selected from the group consisting of Y, La, Nd and Er.

5. The glass of claim 1 wherein RE is Y or La.

6. The glass of claim 5 further comprising additives of other oxides used to modify the properties of the glass.

7. The glass of claim 1 consisting essentially of $RE_2O_3$ and $Al_2O_3$ in the ranges stated therein.

8. The glass of claim 7 comprising at least 5 molar % $La_2O_3$.

9. A bulk single phase glass comprising one or more rare earth oxides, aluminum oxide and silicon dioxide wherein the composition lies substantially within the heptagonal region of the ternary composition diagram of the rare earth oxide-alumina-silica system defined by points having the following molar percent compositions: 1% $RE_2O_3$, 59% $Al_2O_3$ and 40% $SiO_2$; 1% $RE_2O_3$, 71% $Al_2O_3$ and 28% $SiO_2$; 23% $RE_2O_3$ and 77% $Al_2O_3$; 50% $RE_2O_3$ and 50% $Al_2O_3$; 50% $RE_2O_3$ and 50% $SiO_2$; 33.33% $RE_2O_3$, 33.33% $Al_2O_3$ and 33.33% $SiO_2$; and 16.67% $RE_2O_3$, 50% $Al_2O_3$ and 33.33% $SiO_2$.

10. A bulk single phase glass consisting essentially of:
    (a) 1 to 50 molar % $RE_2O_3$;
    (b) 0 to 71 molar % $Al_2O_3$;
    (c) 0 to 35 molar % $SiO_2$; and
    (d) 0 to 15 molar % other oxides;
    wherein the total concentration of $RE_2O_3$ and $Al_2O_3$ is at least 55 molar % and wherein RE is one or more elements selected from the group consisting of Sc, Y, La, Ce, Pr, Nd, Pm, Sm, Eu, Gd, Tb, Dy, Ho, Er, Tm, Yb and Lu.

11. The glass of claim 10 wherein the amount of $SiO_2$ is less than 30 molar %.

12. The glass of claim 10 wherein the amount of other oxides is less than 5 molar %.

13. The glass of claim 10 wherein the total concentration of $RE_2O_3$ and $Al_2O_3$ exceeds 65 molar %.

* * * * *